US008820853B1

(12) United States Patent
Barefoot

(10) Patent No.: US 8,820,853 B1
(45) Date of Patent: Sep. 2, 2014

(54) WHEEL AXLE ASSEMBLY

(75) Inventor: Darek C. Barefoot, Grand Junction, CO (US)

(73) Assignee: Eko Sport, Inc., Grand Junction, CO (US)

( * ) Notice: Subject to any disclaimer, the term of this patent is extended or adjusted under 35 U.S.C. 154(b) by 581 days.

(21) Appl. No.: 13/072,118

(22) Filed: Mar. 25, 2011

Related U.S. Application Data

(60) Provisional application No. 61/317,301, filed on Mar. 25, 2010.

(51) Int. Cl.
B60B 27/06 (2006.01)
B60B 35/00 (2006.01)

(52) U.S. Cl.
USPC .................. 301/124.2; 301/110.5; 301/110.6

(58) Field of Classification Search
USPC .............. 301/124.2, 110.5, 110.6, 55, 57, 59, 301/124.1; 280/288.4, 276
See application file for complete search history.

(56) References Cited

U.S. PATENT DOCUMENTS

| 1,857,659 | A | | 5/1932 | Reid |
| 2,323,813 | A | | 7/1943 | Fred |
| 3,807,761 | A | | 4/1974 | Brilando et al. |
| 4,026,572 | A | | 5/1977 | Yoshioka |
| 4,400,038 | A | | 8/1983 | Hosokawa |
| 4,483,400 | A | | 11/1984 | Arndt |
| 4,789,206 | A | * | 12/1988 | Ozaki ........................ 301/124.2 |
| 4,805,941 | A | | 2/1989 | Downing et al. |
| 4,850,607 | A | | 7/1989 | Trimble |
| 4,906,053 | A | | 3/1990 | Kawai |
| 5,135,330 | A | * | 8/1992 | Chen ........................... 403/374.5 |
| 5,243,879 | A | | 9/1993 | Nagano |
| 5,441,286 | A | | 8/1995 | Pozzobon |
| 5,494,390 | A | * | 2/1996 | Gonzales ....................... 411/368 |
| 5,549,315 | A | | 8/1996 | Ashman |
| 5,567,020 | A | * | 10/1996 | Phillips et al. ............. 301/124.2 |
| 5,630,652 | A | | 5/1997 | Czech |
| 5,673,925 | A | | 10/1997 | Stewart |
| 6,018,869 | A | | 2/2000 | Slankard et al. |
| 6,089,675 | A | | 7/2000 | Schlanger et al. |
| 6,210,091 | B1 | | 4/2001 | Ono et al. |
| 6,386,643 | B1 | | 5/2002 | Marzocchi et al. |

(Continued)

FOREIGN PATENT DOCUMENTS

| CH | 272136 | 3/1951 |
| DE | 19513764 | 10/1996 |

(Continued)

Primary Examiner — Glenn Dayoan
Assistant Examiner — Sunsurraye Westbrook
(74) Attorney, Agent, or Firm — Jason H. Foster; Kremblas & Foster

(57) ABSTRACT

A wheel assembly quick release lever pivots against a thrust washer to apply a force along the length of an axle. The thrust washer is pressed toward a sleeve nut at the opposite end of the axle, which displaces the thrust washer relative to the axle, drawing the sleeve nut and a pair of compression rings toward one another deeper into conical cavities of dropouts. The radially outwardly facing surfaces of the compression rings firmly seat against the tapered cavities of the closed bore dropouts, and the radially inwardly facing surfaces of the compression rings firmly seat against the axle to provide resistance to rotational movement of the axle relative to the dropouts. The inboard surfaces of the dropouts seat against the load-bearing axle faces of the hub, which provides resistance to lateral movement.

19 Claims, 5 Drawing Sheets

(56) References Cited

U.S. PATENT DOCUMENTS

| | | |
|---|---|---|
| 6,409,281 B1 * | 6/2002 | Kanehisa et al. .......... 301/110.5 |
| 6,742,849 B1 | 6/2004 | Denby |
| 6,761,417 B2 | 7/2004 | Denby |
| 6,782,996 B1 | 8/2004 | Wolf |
| 6,829,965 B1 | 12/2004 | Mombrinie |
| 6,886,894 B2 | 5/2005 | Kanehisa et al. |
| 7,090,308 B2 | 8/2006 | Rose et al. |
| 7,494,145 B2 | 2/2009 | Schroeder et al. |
| 7,537,291 B2 | 5/2009 | Hara |
| 7,946,659 B2 | 5/2011 | Gratz |
| RE42,436 E | 6/2011 | Rogers |
| 8,042,881 B2 | 10/2011 | Inoue et al. |
| 8,052,225 B2 | 11/2011 | Inoue et al. |
| 8,419,137 B2 | 4/2013 | Inoue et al. |
| 8,424,975 B2 | 4/2013 | Inoue et al. |
| 2004/0084955 A1 | 5/2004 | Denby |
| 2005/0110335 A1 | 5/2005 | Rose |
| 2005/0145061 A1 | 7/2005 | Ording et al. |
| 2006/0145530 A1 | 7/2006 | Damon |
| 2008/0197604 A1 | 8/2008 | Hara |
| 2008/0272645 A1 | 11/2008 | Gratz |

FOREIGN PATENT DOCUMENTS

| | | |
|---|---|---|
| DE | 202007006451 | 11/2007 |
| EP | 0890505 | 1/1999 |
| EP | 1452435 | 2/2004 |
| EP | 1990265 | 4/2008 |
| EP | 1961650 | 8/2008 |
| FR | 002776612 | 10/1999 |
| FR | 2782471 | 2/2000 |
| GB | 0341220 | 12/1929 |
| GB | 2414971 | 12/2005 |

* cited by examiner

WHEEL AXLE ASSEMBLY

CROSS-REFERENCES TO RELATED APPLICATIONS

This application claims the benefit of U.S. Provisional Application No. 61/317,301 filed Mar. 25, 2010, which application is hereby incorporated by reference.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

The present invention relates to axle assemblies for mounting wheels to vehicles. More particularly, the invention relates to conveniently and securely mounting wheels to bicycles in a manner that allows removal of the wheel without tools.

It has long been known that the quick and easy removal of wheels from bicycles, without the need for tools, has advantages for timely repair of tires and other wheel components and for convenient transport and storage of the entire bicycle. At the same time, a secure and rigid connection of the bicycle wheel is necessary for good handling characteristics and rider safety. A secure connection is most important in the case of the front wheel, since unwanted detachment or instability of the front wheel disproportionately exposes the rider to the risk of a serious accident.

Axle designs that fix a wheel to a bicycle without the need for tools have been popular for many years. In one conventional design, the ends of the wheel axle are displaced perpendicular to the axle's length into slots or "dropouts" in the front fork blades or rear stays of the bicycle. Then the axle is clamped against the faces of the slots in the axial direction by the pressure of a lever-operated cam or screw. Raised tabs or ridges on the faces of the fork blades help to retain the wheel in the slot even if the lever or screw loosens unintentionally. In design variations, other mechanically engaging features are added to the basic design to prevent unintended wheel detachment, ensure a consistent level of clamping force and improve convenience of wheel mounting and dismounting.

Axle systems that secure the axle in slots with clamping force typically provide less stability of the wheel than wheel systems that secure the axle ends in substantially closed bores. Especially where stresses on the bicycle wheel are high, such as in off-road cycling, the advantageous stability of closed bore dropouts have favored "thru-axle" designs. In these designs, a mounting axle is inserted through the fork ends and wheel hub from one side of the bicycle along the axle's length. The axle engages a closed bore in at least one of the fork legs. In more traditional versions of the system, clamps on the ends of the fork legs tightly connect the mounting axle to the fork on either side while an end bolt secures the mounting axle somewhat in the axial direction. Typically, however, such designs do not clamp the fork legs tightly against the hub in the axial direction. Moreover, the dropout bores have narrow slots in order to clamp around the axle by means of screw or cam fasteners. The narrow slots of the dropout bores result in less rigidity under high lateral loads on the wheel than fully closed bores.

The inconvenience of securing multiple clamps has led to the design of "quick release" versions of the thru-axle arrangement. Examples of quick release versions include the devices of U.S. Pat. No. 7,090,308, United States Patent Application Publication Numbers 2009/0072613 and 2009/0140571 and British Patent No. GB2414971B. These devices offer enhanced wheel retention compared to axles that engage open slots. However, with the exception of the first device cited, all these devices stabilize the wheel simply by using the mounting axle to clamp the fork legs against the ends of the hollow axle of the hub.

Regarding the devices cited above, the mounting axles fit tightly in the bore or bores of the fork legs and engage the outboard surfaces of the legs to apply tension in the axial direction to pull the legs inwardly against the hub. However, these devices have no torsionally rigid connection to the legs, which allows torsional flexure to go without resistance. Torsional flexure occurs when a lateral force is applied to the wheel tending to rotate the wheel to the side relative to the handlebars. In this situation, one fork leg tends to move forwardly relative to the other fork leg about the portion of the fork that connects the two fork legs. This pivoting causes the walls defining each leg's apertures (through which the axle extends) to rotate relative to the axle in opposite directions.

This phenomenon is demonstrated by imagining a conventional bicycle wheel secured in a fork with one of the above-referenced devices, and the structures connecting the two fork legs being cut. In a conventional design, the two legs could rotate around the wheel axis independently of one another with relatively little resistance. Although cutting of the structure connecting the forks would rarely be encountered, it is common to encounter torsional forces of the forks against the axle as described above. Therefore, resistance to torque provides advantages.

The quick release thru-axle device disclosed in U.S. Pat. No. 7,090,308 clamps the mounting axle to the fork leg bores when a cam lever is operated by expanding the slotted ends of the hollow mounting axle. Consequently, it provides significant resistance against independent rotational flexure of the legs. Nevertheless, unlike the other devices cited in the previous paragraph, it does not clamp the hub tightly against the fork dropouts in the axial direction.

The need therefore exists for an improved wheel axle system for a bicycle or other vehicle.

BRIEF SUMMARY OF THE INVENTION

The invention is a clamping assembly used where an axle assembly is fixed to first and second structural members, such as bicycle fork legs. The axle assembly has first and second ends and a longitudinal axis. The first axle assembly end is releasably fixed to the first structural member and the second end is releasably fixed to the second structural member.

The axle assembly rotatably mounts a wheel and hub assembly on an axle portion of the axle assembly, which axle portion is located between the first and second axle assembly ends. The first structural member has a substantially closed bore dropout with a first side, from which the axle portion extends, and a second side. The second structural member has a substantially closed bore dropout.

The improvement to the clamping assembly includes a first compression member, which can be a slotted ring, disposed in a first tapered cavity in the first structural member's dropout. The axle portion extends through an aperture in the first compression member and the first compression member and the first tapered cavity are axially aligned with the axle portion.

A second compression member is disposed in a second tapered cavity in the second structural member's dropout. The axle portion extends through an aperture in the second compression member and the second compression member and the second tapered cavity are axially aligned with the axle portion.

An abutment member, which can be a washer, is adjacent to a large diameter end of the first compression member and axially displaceable relative to the axle portion. A quick release is disposed at the first end for providing a force acting in the direction of the longitudinal axis between the first and second ends of the axle assembly. The force clamps the axle assembly to the structural members, whereby the axle assembly can be removed from the substantially closed bore dropout in a direction parallel to the longitudinal axis.

In a preferred embodiment of the invention, each of the structural members includes a fully closed bore dropout. A threaded connection preferably releasably fixes at least one of the axle assembly ends to a corresponding one of the structural members. The quick release preferably includes a cam configured to apply a clamping force in the direction of the longitudinal axis. The first and second compression members preferably comprise tapered and slotted compression rings.

Such a system has connections that resist independent rotational movement of the fork legs or similar wheel-supporting structures. The invention also accomplishes clamping of the hub in the axial direction against fully closed bore dropouts on either side for maximum lateral rigidity of the wheel mounting. Such a system provides convenience of operation that allows quick installation and removal of the wheel without tools, including the ability to set the clocked position of the cam lever, when closed, wherever the end user desires.

Figure 1:
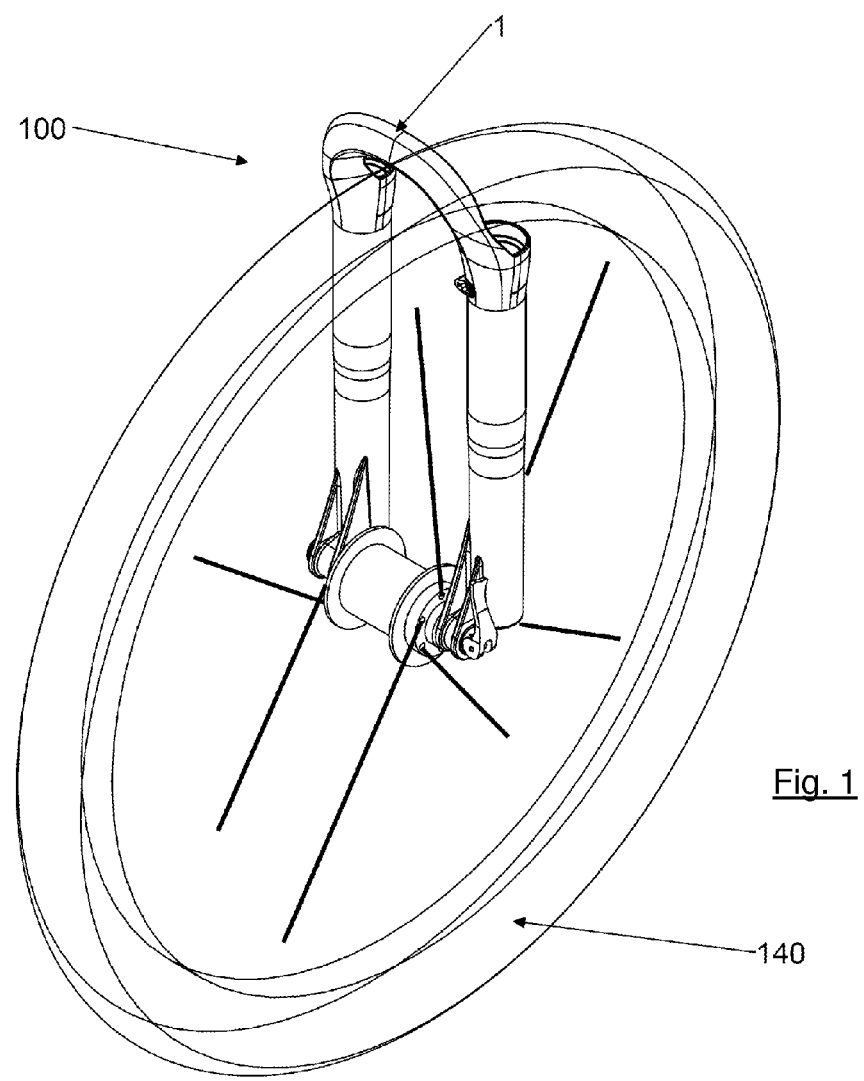
FIG. 1 is a schematic view in perspective illustrating a front wheel assembly of a bicycle in which the front wheel is mounted to a front fork using the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

U.S. Provisional Application Ser. No. 61/317,301 filed Mar. 25, 2010, which is the above claimed priority application, is incorporated in this application by reference.

Figure 2:
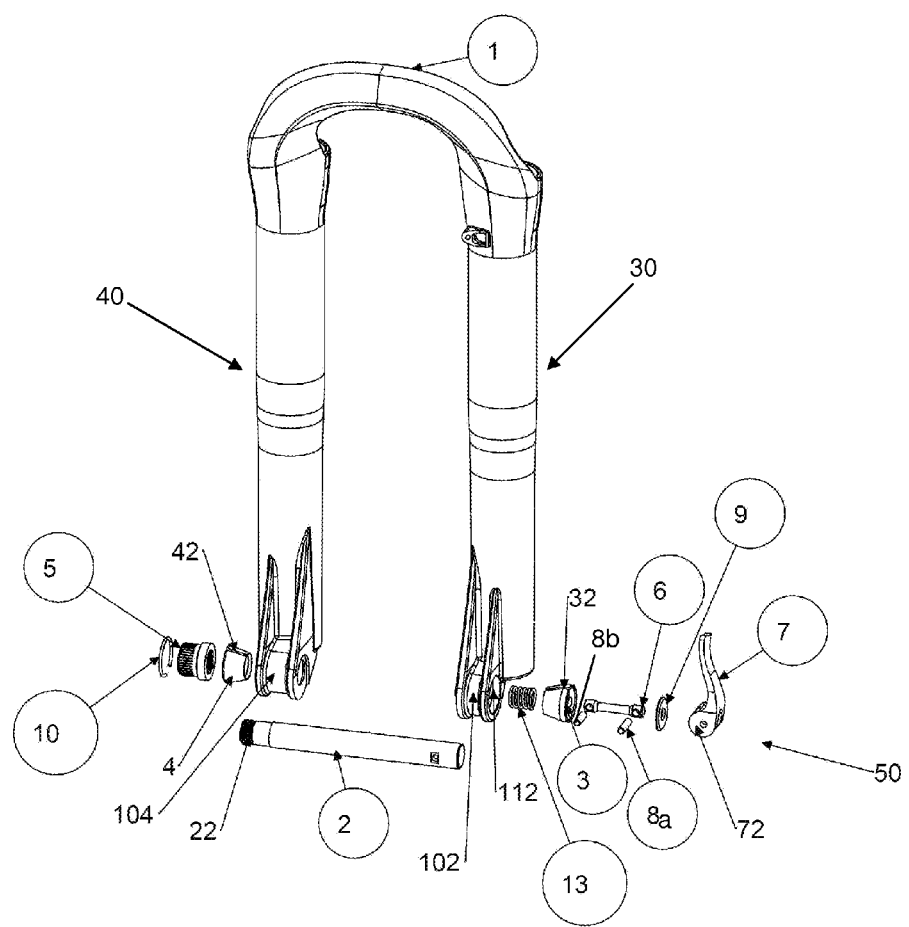
FIG. 2 is an exploded view in perspective illustrating the present invention.
Figure 3:
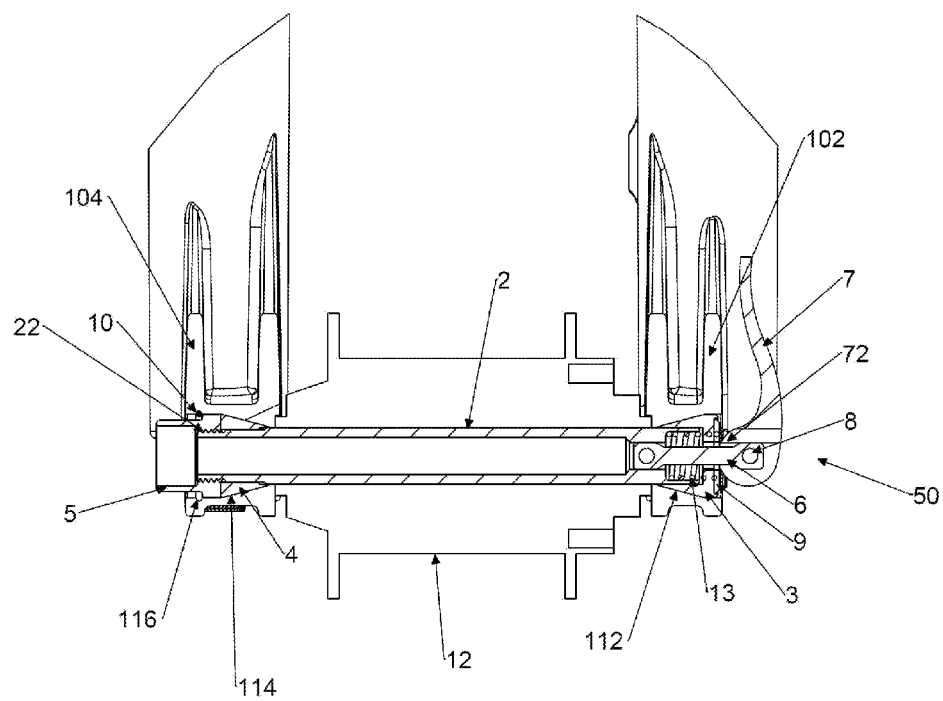
FIG. 3 is an end view in section illustrating a hub and axle according to the present invention.

FIG. 1 shows a front wheel assembly 100 of a bicycle, which has a front wheel 140 mounted to a front fork 1. The fork 1 has a pair of fork legs 30 and 40 on opposite sides of the wheel 140. As illustrated in FIGS. 1, 2 and 3, closed bore dropouts 102 and 104 are formed at the lower ends of the fork legs 30 and 40, and the axle assembly 50 extends through the dropouts 102 and 104 and the hub 12 to fix the wheel 140 to the fork 1.

The dropouts 102 and 104 have tapered, more specifically conical, cavities 112 and 114 extending therethrough as best viewed in FIG. 3. The cavities 112 and 114 are aligned along a line that defines the axis of rotation of the hub 12. The axle assembly 50 extends through the dropouts 102 and 104 and attaches to the fork legs 30 and 40. The hub 12 is then rotatably mounted to the axle assembly 50 as explained in more detail below after the axle assembly is described.

A quick release lever 7 with a cam 72 is mounted at one end of the axle assembly 50. The lever 7 pivotably attaches to the linking rod 6 by the pin 8a. The pin 8b attaches the linking rod 6 to the mounting axle portion 2. The linking rod 6 extends through an abutment member, such as the thrust washer 9, a compression ring, such as the tapered, slit ring 3, and the return spring 13 as shown in FIG. 3. A compression ring, such as the tapered, slit ring 4, is disposed in the conical cavity 114 of the closed bore dropout 104 on the side of the fork leg 40 opposite the quick release lever 7.

The sleeve nut 5 is knurled on its radially outwardly facing surface, so that it can easily be rotated by hand, and is preferably threaded on its radially inwardly facing surface so it can receive the radially outwardly facing threads 22 on the end of the axle portion 2. Of course, other fastening structures can be used. One end of the sleeve nut 5 abuts a large, outboard end of the tapered compression ring 4. The opposite end of the portion of the sleeve nut 5 that is flared outwardly to form a flange seats against the wire clip 10, which thereby captures and retains the sleeve nut 5 within the closed bore dropout 104. The wire clip 10 is a spring metal member that has an open circular shape that is retained in the groove 116 formed in the sidewall of the cavity 114 so that the wire clip 10 cannot move along the length of the axle 2 and protrudes slightly into the barrel of the cavity 114. Thus, the sleeve nut 5 cannot move outboard from its position shown in FIG. 3 due to the wire clip 10, and the sleeve nut 5 cannot move inboard more than a short distance because it abuts the large diameter end of the compression ring 4, which in turn is captured on the inboard side by the taper of the sidewall defining the cavity 114. Thus, the sleeve nut 5 is rotatably mounted to the dropout 104, but is permanently retained within the dropout cavity 114.

The threads 22 on the end of the mounting axle portion 2 of the axle assembly 50 are shown in FIG. 3 engaged with the sleeve nut 5. When the cam 72 of the quick release lever is forced against the thrust washer 9 by the lever 7 being pivoted, an inboard-directed, longitudinal force is applied along the length of the axle portion 2 as the larger radius portion of the cam 72 slides against the thrust washer 9. By this longitudinal force, the thrust washer 9 is pressed toward the sleeve nut 5, thereby displacing the thrust washer 9 relative to the axle portion 2. This movement draws the sleeve nut 5, and therefore the compression ring 4, toward the compression ring 3, thus causing both compression rings 3 and 4 to slide toward one another in their respective tapered cavities 112 and 114. This continues as long as the lever 7 is pivoted or until the force necessary to further insert the compression rings 3 and 4 into the tapered cavities is too great for the person pivoting the lever 7 to generate. Of course, it is possible to omit the thrust washer 9 and seat the cam surface directly against the compression ring 3.

Because the clamping force is directed against the large ends of the compression rings 3 and 4, the rings are thereby driven into the conical cavities 112 and 114 of the closed bore dropouts 102 and 104, respectively. Therefore, by the movement of the lever 7, the radially outwardly facing surfaces of the compression rings 3 and 4 are firmly seated against the tapered cavities 112 and 114 of the closed bore dropouts, and the radially inwardly facing surfaces of the compression rings 3 and 4 are firmly seated against the axle portion 2. This provides enormous frictional resistance to rotational movement of the axle portion 2 relative to the dropouts 102 and 104. Furthermore, the inboard surfaces of the dropouts seat against the load-bearing axle faces of the hub 12, which provides substantial resistance to lateral movement.

The preferably aluminum compression rings 3 and 4 have longitudinal slots 32 and 42, respectively, which allow the rings to compress transversely (radially) when they are driven into the conical cavities 112 and 114 of the closed bore dropouts 102 and 104 by the clamping force of the quick release lever 7. The slots 32 and 42 in the compression rings 3 and 4 allow the rings to tighten radially against the outer diameter of the mounting axle portion 2 as they simultaneously tighten against the surfaces of the conical cavities 112 and 114. Of course, materials exist that are transversely compressible and do not require such slots, including, but not limited to, the polymer material sold under the trademark DELRIN. As the compression rings 3 and 4 bind the axle ends radially to the dropouts, the inboard surfaces of the dropouts 102 and 104 clamp tightly against the ends of the hub 12 in the axial direction for maximum lateral rigidity of the wheel mounting. This wheel clamping assembly is extremely strong and rigid laterally and torsionally when assembled as described above.

When the longitudinal clamping force against the closed bore dropouts 102 and 104 is relieved by pivoting the cam 72 of the quick release lever 7 away from the thrust washer 9, the return spring 13 urges the compression ring 3 against the lever 7 so as to prevent excessive looseness in the lever operation. The assembly 50 can then be removed, in part, from the fork 1 as described below.

In operation the user will install a wheel in the following manner. After inserting the wheel between the fork blades 30 and 40 and aligning the aperture of the hub with the dropouts 102 and 104, the user slides the axle portion 2 through the closed bore dropouts 102 and 104 and the hub 12 and seats the threads 22 of the mounting axle portion 2 against the sleeve nut 5. During insertion, the compression ring 3, return spring 13, pins 8a and 8b, linking rod 6, thrust washer 9 and cam lever 7 are all mounted to the axle portion 2. Preferably, the compression ring 4 and sleeve nut 5 remain, at all times after initial installation, within the cavity 114 of the dropout 104, as retained by the wire clip 10.

Because the threads 22 of the axle end are not axially loaded until the quick release lever 7 is pivoted to apply clamping force, the user rotates the sleeve nut 5 by hand relative to the lever end of the axle 2 in order to preset the tension of the clamp. If the clamping force is either too strong or too weak when the lever 7 is pivoted to the closed position (shown in FIG. 3), the lever 7 can be opened again and both the clamping tension (set by the relative position of the sleeve nut 5 and the axle portion 2) and the "clocking" (rotational position) of the quick release lever 7 can be conveniently reset by the user before the lever 7 is pivoted closed again. Removal is effected by reversing the steps—pivoting the lever 7 open, rotating the sleeve nut 5 relative to the axle portion 2 and withdrawing the axle portion 2 from the hub 12 along the length of the axle portion 2.

It will be appreciated that the "wedge effect" created by the longitudinal force applied against the compression rings 3 and 4 securely connects the axle ends to the dropouts 102 and 104 to provide significant resistance to independent rotational movement of the fork legs 30 and 40 around the wheel axis. The dropouts 102 and 104 are simultaneously clamped tightly against the hub 12 for lateral rigidity of the wheel mounting. This structure has substantial utility and advantages as compared to the prior art.

Figure 4:
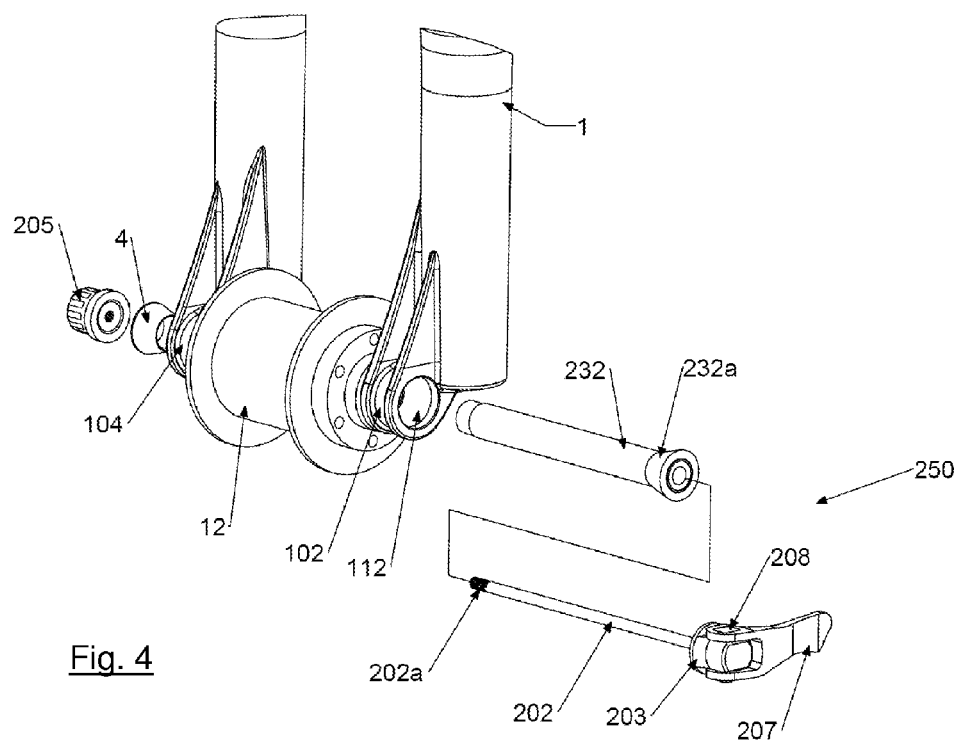
FIG. 4 is an exploded view in perspective illustrating an alternative embodiment of the present invention.

FIG. 4 shows an alternative embodiment of the invention in which the first elongated compression member 232 has a conical profile 232a at one end. This conical profile 232a mates with the conical tapered cavity 112 of the closed bore dropout 102. The axle portion 202 has external threads 202a at its distal end, and upon installation the threads 202a engage with the internal threads of the knurled nut 205. When the cam lever 207 at the proximal end of the axle assembly 250 is rotated on the axis of the pin 208 after installation of the threads 202a in the knurled nut 205, the nut 205 and abutment member 203 are drawn inboard toward one another. This thereby drives the compression members 232 and 4 into the tapered cavities of the dropouts 102 and 104, respectively. The inwardly-directed force causes the radially inwardly facing surface of the compression member 4 to seat against and clamp around the distal end of the compression member 232 while the radially outwardly facing surface of the compression member 4 seats against and frictionally engages the tapered cavity 114 (not shown in FIG. 4) of the dropout 104. Simultaneously, axial compression drives the conical portion 232a of the compression member 232 into frictional engagement with the tapered cavity 112 and the inboard faces of the dropouts 102 and 104 clamp tightly against the load bearing faces of the hub 12. The axle assembly 250 thereby generates resistance to rotational movement of the dropouts 102 and 104 relative to each other and simultaneously clamps the hub 12 axially to resist lateral movement.

Figure 5:
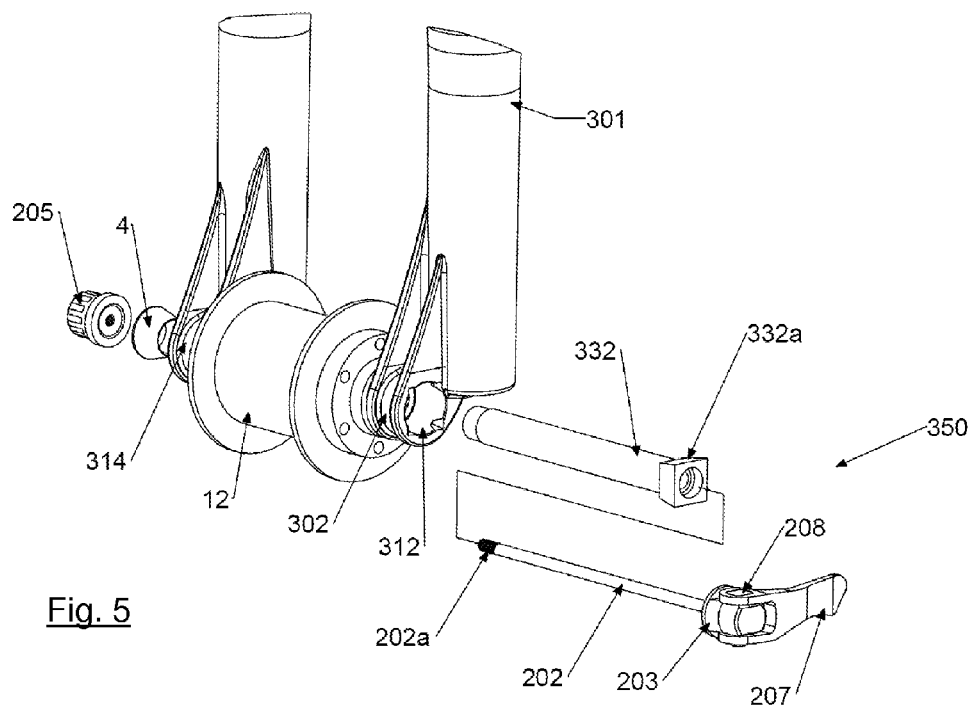
FIG. 5 is an exploded view in perspective illustrating another alternative embodiment of the present invention.

FIG. 5 shows another alternative embodiment of the invention in which the compression member 332 has at its proximal end a non-round, tapered profile 332a, rather than a conical profile. The non-round profile 332a mates with a corresponding non-round profile extending partially into the cavity 312 of the closed bore dropout 302. As in the embodiment of FIG. 4, the conical compression member 4 engages the tapered conical cavity (not shown in FIG. 5) of the dropout 314. The axle portion 202 and cam lever 207 are the same as shown in the embodiment of FIG. 4. Upon installation of the axle portion 202 in the compression member 332 with the threads 202a threaded into the knurled nut 205, rotation of the cam lever 207 around the pin 208 draws the compression member 4 into the tapered cavity of the dropout 314 as the non-round profile 332a of the compression member 332 slidingly engages the mating profile of cavity 312. Since the non-round profile of the cavity 312 extends only partially into the cavity 312, axial movement of the compression member 332 is arrested at its proximal end when the non-round profile 332a reaches the limits of the cavity 312. Thereafter, further drawing together of the components causes the compression member 4 to wedge further against both the cavity of the dropout 314 and the distal end of the compression member 332 in frictional engagement as with the compression member 4 of the FIG. 4 embodiment. The radial clamping in the dropout 314, the rotational resistance of the non-round mating profiles in the dropout 312, and the axial clamping of the inboard dropout faces against the load bearing faces of the hub 12 combine to provide significant resistance to undesirable rotational and lateral movement of the hub and fork legs relative to each other.

The non-round profile 332a and the corresponding profiles on the sidewall of the cavity 112 have a "square" shape with sidewalls that taper toward one another at the inboard end. Of course, a non-round profile could be substituted that has a shape with more or fewer than four sides, and the sides can be symmetrical and equal or asymmetrical and unequal. For example, a five, six, seven or eight-sided, non-round profile could replace that shown in FIG. 5, as could an irregular profile. Many other examples of profiles that are not round will become apparent to a person having ordinary skill from the illustrations and description herein.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. An improved wheel clamping assembly in which an axle assembly is affixed to first and second structural members, said axle assembly including first and second ends and a longitudinal axis, said first end releasably fixed to said first structural member and said second end releasably fixed to said second structural member, said axle assembly rotatably mounting a wheel and hub assembly on an axle portion of said axle assembly, said axle portion located between said first and second axle assembly ends, the first structural member having a substantially closed bore dropout with a first side from which said axle portion extends and a second side, the second structural member having a substantially closed bore dropout, the improvement comprising:
   (a) a first compression member having a tapered outer surface disposed in a first cavity having a tapered inner surface in the first structural member's dropout with the axle portion extending through an aperture in the first compression member, wherein the first compression member and the first cavity are axially aligned with said axle assembly;
   (b) a second compression member having a tapered outer surface disposed in a second cavity having a tapered inner surface in the second structural member's dropout with the axle portion extending through an aperture in the second compression member, wherein the second compression member and the second cavity are axially aligned with said axle assembly;
   (c) an abutment member adjacent to a large diameter end of said first compression member and axially displaceable relative to said axle portion; and
   (d) a quick release at the first end for providing a force acting in the direction of the longitudinal axis between the first and second ends, said force clamping said axle assembly to said structural members, whereby the axle assembly is configured to be removed from said substantially closed bore dropouts in a direction parallel to said longitudinal axis.

2. The improved wheel clamping assembly in accordance with claim 1, wherein each of said structural members comprises a fully closed bore dropout.

3. The improved wheel clamping assembly in accordance with claim 1, wherein a threaded connection releasably fixes at least one of said ends of the axle assembly to a corresponding one of said structural members.

4. The improved wheel clamping assembly in accordance with claim 1, wherein the quick release further comprises a cam configured to apply a clamping force in the direction of said longitudinal axis.

5. The improved wheel clamping assembly in accordance with claim 1, wherein at least one of the first and second compression members further comprise a tapered and slotted compression ring.

6. The improved wheel clamping assembly in accordance with claim 1, further comprising a rotatable, captured fastener axially retained in one of the closed bore dropouts.

7. The improved wheel clamping assembly in accordance with claim 1, wherein the first and second compression members further comprise tapered and slotted compression rings.

8. The improved wheel clamping assembly in accordance with claim 1, wherein the first and second compression members are transversely deformable.

9. An improved wheel clamping assembly in which an axle assembly is affixed to first and second structural members, said axle assembly including first and second ends and a longitudinal axis, said first end releasably fixed to said first structural member and said second end releasably fixed to said second structural member, said axle assembly rotatably mounting a wheel and hub assembly on an axle portion of said axle assembly, said axle portion located between said first and second axle assembly ends, the first structural member having a substantially closed bore dropout with a first from which said axle portion extends and a second side, the second structural member having a substantially closed bore dropout, the improvement comprising:
   (a) a first compression member having a tapered outer surface disposed in a first cavity having a tapered inner surface in the first structural member's dropout with the axle portion extending through an aperture in the first compression member, wherein the first compression member and the first cavity are axially aligned with said axle assembly;
   (b) a second, transversely deformable compression member having a tapered outer surface disposed in a second cavity having a tapered inner surface in the second structural member's dropout with the axle portion extending through an aperture in the second compression member, wherein the second compression member and the second cavity are axially aligned with said axle assembly;
   (c) an abutment member adjacent to one end of said first compression member and axially displaceable relative to said axle portion; and
   (d) a quick release at the first end for providing a force acting in the direction of the longitudinal axis between the first and second ends of the axle assembly, said force clamping said axle assembly to said structural members, whereby the axle assembly is configured to be removed from said substantially closed bore dropouts in a direction parallel to said longitudinal axis.

10. The improved wheel clamping assembly in accordance with claim 9, further comprising a rotatable, captured fastener axially retained in one of the substantially closed bore dropouts.

11. The improved wheel clamping assembly in accordance with claim 9 wherein each of said structural members includes a fully closed bore dropout.

12. An improved wheel clamping assembly in which an axle assembly is affixed to first and second structural members, said axle assembly including first and second ends and a longitudinal axis, said first end releasably fixed to said first structural member and said second end releasably fixed to said second structural member, said axle assembly rotatably mounting a wheel and hub assembly on an axle portion of said axle assembly, said axle portion located between said first and second axle assembly ends, the first structural member having a substantially closed bore dropout with a first side from which said axle portion extends and a second side, the second structural member having a substantially closed bore dropout, the improvement comprising a rotatable, captured fastener axially retained in at least one of the substantially closed bore dropouts and to which the axle portion attaches, wherein the fastener applies a direct axial load to a compression member within the dropout.

13. An improved wheel clamping assembly in which an axle assembly is affixed to first and second structural members, said axle assembly including first and second ends and a longitudinal axis, said first end releasably fixed to said first structural member and said second end releasably fixed to said second structural member, said axle assembly rotatably mounting a wheel and hub assembly on an axle portion of said axle assembly, said axle portion located between said first and second axle assembly ends, the first structural member having a substantially closed bore dropout with a first from which said axle portion extends and a second side, the second structural member having a substantially closed bore dropout, the improvement comprising:
  (a) the substantially closed bore dropout of said first structural member has a non-round radial profile;
  (b) a first compression member has a non-round profile that mates with the non-round radial profile of the substantially closed dropout of said first structural member and the axle portion extends through an aperture in the first compression member;
  (c) a second compression member having a tapered outer surface disposed in a cavity having a substantially round tapered inner surface in the second substantially closed structural member's dropout with the axle portion extending through an aperture in the second compression member; and
  (d) an abutment member adjacent to one of said compression members and axially displaceable relative to said axle portion.

14. The device of claim 13 wherein the second compression member further comprises a tapered and slotted compression ring.

15. The device of claim 13 wherein the second compression member further comprises a transversely deformable compression ring.

16. The device of claim 13 further comprising a quick release at the first end for providing a force acting in the direction of the longitudinal axis between the first and second ends of the axle assembly, said force clamping said axle assembly to said structural members, whereby the axle assembly is configured to be removed from said substantially closed bore dropouts in a direction parallel to said longitudinal axis.

17. An improved wheel clamping assembly in which an axle assembly is configured to be affixed to first and second structural members, said axle assembly including first and second ends and a longitudinal axis, said first end configured for releasable attachment to said first structural member and said second end configured for releasable attachment to said second structural member, said axle assembly configured to rotatably mount a wheel and hub assembly on an axle portion of said axle assembly, said axle portion located between said first and second axle assembly ends, the first structural member having a substantially closed bore dropout with a first side from which said axle portion is configured to extend and a second side, the second structural member having a substantially closed bore dropout, the improvement comprising:
  (a) a first compression member having a tapered outer surface for disposing in a first cavity having a tapered inner surface in the first structural member's dropout with the axle portion extending through an aperture in the first compression member, wherein the first compression member and the first cavity are configured for axial alignment with said axle assembly;
  (b) a second compression member having a tapered outer surface configured to be disposed in a second cavity having a tapered inner surface in the second structural member's dropout with the axle portion extending through an aperture in the second compression member, wherein the second compression member and the second cavity are configured for axial alignment with said axle assembly;
  (c) an abutment member configured to be disposed adjacent a large diameter end of said first compression member and axially displaceable relative to said axle portion; and
  (d) a quick release at the first end for providing a force acting in the direction of the longitudinal axis between the first and second ends, said force clamping said axle assembly to said structural members, whereby the axle assembly is configured to be removed from said substantially closed bore dropouts in a direction parallel to said longitudinal axis.

18. An improved wheel clamping assembly in which an axle assembly is affixed to first and second structural members, said axle assembly including first and second ends and a longitudinal axis, said first end releasably fixed to said first structural member and said second end releasably fixed to said second structural member, said axle assembly rotatably mounting a wheel and hub assembly on an axle portion of said axle assembly, said axle portion located between said first and second axle assembly ends, the first structural member having a substantially closed bore dropout with a first side from which said axle portion extends and a second side, the second structural member having a substantially closed bore dropout, the improvement comprising:
  (a) a first compression member having a tapered outer surface disposed in a first cavity having a tapered inner surface in the first structural member's dropout with the axle portion extending through an aperture in the first compression member, wherein the first compression member and the first cavity are axially aligned with said axle assembly;
  (b) a second compression member having a tapered outer surface disposed in a second cavity having a tapered inner surface in the second structural member's dropout with the axle portion extending through an aperture in the second compression member, wherein the second compression member and the second cavity are axially aligned with said axle assembly; and
  (c) a quick release at the first end, said quick release having a cam surface for providing a force acting in the direction of the longitudinal axis between the first and second ends, said force clamping said axle assembly to said structural members, whereby the axle assembly is configured to be removed from said substantially closed bore dropouts in a direction parallel to said longitudinal axis.

19. The device of claim 16, further comprising a rotatable, captured fastener axially retained at the second end.

* * * * *

UNITED STATES PATENT AND TRADEMARK OFFICE
CERTIFICATE OF CORRECTION

| | | |
|---|---|---|
| PATENT NO. | : 8,820,853 B1 | Page 1 of 1 |
| APPLICATION NO. | : 13/072118 | |
| DATED | : September 2, 2014 | |
| INVENTOR(S) | : Darek C. Barefoot | |

It is certified that error appears in the above-identified patent and that said Letters Patent is hereby corrected as shown below:

In the Claims

Col. 8, Line 36, after the word "first" add --side--

Col. 9, Line 30, after the word "first" add --side--

Signed and Sealed this
Eighteenth Day of November, 2014

Michelle K. Lee
*Deputy Director of the United States Patent and Trademark Office*